(12) United States Patent
Dodd et al.

(10) Patent No.: US 6,663,680 B1
(45) Date of Patent: Dec. 16, 2003

(54) EMULSION FUELS AND THEIR USE IN GAS TURBINES

(75) Inventors: Peter Jeremy Dodd, Gerrards Cross (GB); Alan Stockwell, Woking (GB)

(73) Assignee: Quadrise Limited, Gerrards Cross (GB)

( * ) Notice: Subject to any disclaimer, the term of this patent is extended or adjusted under 35 U.S.C. 154(b) by 0 days.

(21) Appl. No.: 09/579,615

(22) Filed: May 26, 2000

Related U.S. Application Data

(63) Continuation-in-part of application No. 09/029,284, filed as application No. PCT/GB96/02087 on Aug. 30, 1996, now abandoned.

(30) Foreign Application Priority Data

Aug. 30, 1995 (GB) .............................................. 9517646

(51) Int. Cl.⁷ ................................................. C10L 1/32
(52) U.S. Cl. ........................ 44/301; 44/458; 60/39.02; 60/39.75; 60/39.462; 60/39.464
(58) Field of Search ................. 44/301, 458; 60/39.462, 60/39.464, 39.02, 39.75

(56) References Cited

U.S. PATENT DOCUMENTS

| | | |
|---|---|---|
| 2,920,948 A | 1/1960 | Weeks ............................... 52/5 |
| 4,400,177 A | 8/1983 | Cottell ........................... 44/51 |
| 4,412,844 A | 11/1983 | Collins et al. .................. 44/51 |
| 4,604,188 A | 8/1986 | Yan et al. .................... 208/106 |
| 4,684,372 A | 8/1987 | Hayes et al. .................... 44/51 |
| 4,696,638 A | 9/1987 | DenHerder ..................... 431/4 |
| 4,795,478 A | 1/1989 | Layrisse R. et al. ............ 44/51 |
| 4,801,304 A | 1/1989 | Polanco et al. ................. 44/51 |
| 5,275,671 A * | 1/1994 | Rivenaes et al. ............ 252/546 |
| 5,279,760 A * | 1/1994 | Sato et al. ............. 252/174.22 |
| 5,437,693 A * | 8/1995 | Iizuka et al. ................... 44/302 |

FOREIGN PATENT DOCUMENTS

| | | | |
|---|---|---|---|
| DE | 2757419 | 7/1978 | ............. F02C/7/06 |
| EP | 0682101 A1 | 11/1995 | ............. C10L/1/32 |
| GB | 974042 | 11/1964 | |
| GB | 2191783 | 12/1987 | ............. C10L/1/32 |
| GB | 2262054 | 6/1993 | ............. F17D/1/17 |
| WO | 85/03646 | 8/1985 | ............. B01F/3/10 |

OTHER PUBLICATIONS

Water, Deionized [7732–18–53 ](ING) (SPE) Water, Distilled [7732–18–53 ](WAK) Chem Soures U.S.A. pp. 1424, 1650, No date.*
Pages 1160–1164 "Water". The Encyclopedia of Chemistry, 3rd Ed., Hampel et al., No date.*

* cited by examiner

*Primary Examiner*—Margaret Medley
(74) *Attorney, Agent, or Firm*—Diederiks & Whitelaw, PLC

(57) ABSTRACT

A gas turbine is driven by combustion of a fuel which is a hydrocarbon oil-in-water emulsion. Successful operation is achieved with minimized corrosion of turbine blades by keeping the Na⁺ content of the emulsion to less than 1 ppm. Deionized water is generally to be used in making up the emulsion. Heavy oils can be used because their conversion to oil-in-water emulsion form makes them suited to the pre-atomization requirements of gas turbine combustion.

24 Claims, 1 Drawing Sheet

EMULSION FUELS AND THEIR USE IN GAS TURBINES

Figure 1:
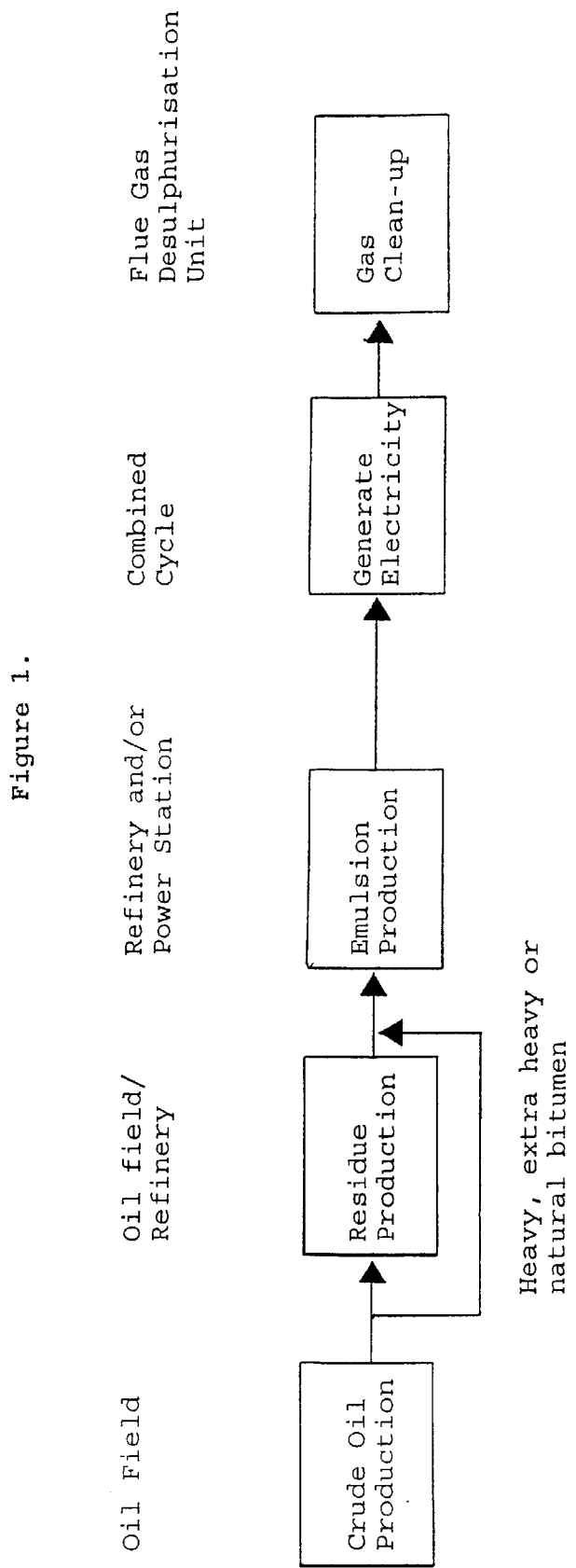

This application is a Continuation-in-Part of application Ser. No. 09/029,284, filed Jul. 17, 1998, abandoned which is a 371 of PCT/GB96/02087 filed Aug. 30, 1996.

BACKGROUND OF THE INVENTION

This invention relates to emulsion fuels and their use in gas turbines. More particularly, but not exclusively, the invention relates to emulsion fuels based on viscous hydrocarbons derived from crude oil or on directly produced high viscosity grades and the use thereof in gas turbines.

Fossil fuel power stations can be considered in two categories: steam thermal power stations and gas turbine power stations. In the former, fuel is burnt to heat water in a boiler and produce steam which drives a turbine; the turbine then drives a generator which produces electricity. In some cases, the steam is then condensed and returned to the boiler for reuse (a so-called "closed cycle"). The efficiency of the conversion of fuel to electricity in steam thermal power stations can be as low as about 30%.

In gas turbine power stations, a fuel, such as gas or oil, is burnt in the combustor of a gas turbine so that the resulting combustion gases drive the turbine which drives a generator. The efficiency of this process is relatively low (about 30%) and many gas turbine power stations include a further step in which the hot combustion gases are used to heat water to steam, which is then used to drive a further generator. This further step may be in a closed cycle. The second step increases the efficiency of gas turbine power stations to as much as over 50%. Such a system is known as a "combined cycle" system.

Refinery bottoms are the residual materials left after atmospheric distillation, vacuum distillation and other processes have been carried out in refineries as part of the conversion of crude oil to useful products. Such refinery bottoms can be used by burning them in power stations. Unfortunately, these residual materials are difficult to handle because of their high viscosities and, if they are to be used as components of fuel oil, they are normally "cut-back" with more valuable products obtained in distillation of the crude oil. The quality of refinery bottoms depends to a large extent on the quality of the crude oil from which they are derived and the cost effectiveness of use of refinery bottoms as a fuel depends upon the proportion of more valuable components of crude oil distillation with which they have to be cut back, although there is little alternative to this use as the refinery bottoms must be disposed of.

In general, it is unavoidable that certain undesirable components of the crude oil are likely to be concentrated in the refinery bottoms. Such undesirable components include sulphur and heavy metals such as vanadium and nickel. These components can lead to the formation of undesirable combustion products such as sulphur oxides and vanadium oxides which can be found in the emissions from power stations. Generally, such emissions need to be cleaned before they can pass into the atmosphere. Such extra treatment can reduce the overall efficiency of converting the liquid fuel into energy.

Naturally, it would be highly desirable to be able to use refinery bottoms, effectively a waste product from the refinery processing of crude oil, to produce electricity with a high conversion factor.

Emulsion fuels containing large amounts of water are more readily handleable than refinery bottoms. In this connection, reference is made to GB-A-974,042 which relates to oil-in-water emulsion fuels comprising a petroleum oil of high viscosity, the oil comprising 60 vol. % of the emulsion such that the emulsion has a viscosity of less than 150 S.S.F. at 77° F. (25° C.). GB-A-974, 042 proposes use of such oil-in-water emulsions in conventional steam thermal burners.

Also in the prior art, DE-A-275419 proposes the use of water-in-oil emulsions having a water content of from 3 to 8% in a gas turbine. Such emulsions consist of droplets of liquid water in a continuous oil phase and, at least insofar as the use of refinery bottoms may be contemplated, water-in-oil emulsions manufactured from refinery bottoms as a base fuel will have significantly higher viscosities than oil-in-water emulsions made from such a base fuel. In fact, there will be little significant difference between the viscosity of the water-in-oil emulsion and the viscosity of the base fuel itself.

SUMMARY OF THE INVENTION

In a first aspect of the invention, there is provided a hydrocarbon oil-in-water emulsion for use as gas turbine fuel, which emulsion is an oil-in-deionized water emulsion containing less than 1 ppm of sodium ions.

According to a second aspect of the present invention, there is provided a method of driving a gas turbine which comprises combusting a pre-atomized hydrocarbon oil-in-water emulsion in the combustor of the turbine.

DETAILED DESCRIPTION OF THE INVENTION

The oil preferably comprises a refinery bottom material or a hydrocarbon oil having physical properties characteristic of a refinery bottom material of oil-in-water emulsions as fuel for gas turbines, although it is to be appreciated that this aspect of the present invention is not limited to such oils. Indeed, lower density oils, such as diesel, can be used in the oil-in-water emulsion. The oil will be washed, if necessary, to remove excess sodium ions before making up into an emulsion embodying the invention.

As the oil-in-water emulsion will generally contain less than 1 ppm of sodium ions and, for this purpose, use will be made of water having an extremely low sodium ion content, if any, as source water for the emulsion. This means that it will be necessary to use deionized water, although use of any other water lacking sodium ions to the same extent as deionized water may be considered as a proper equivalent to deionized water and the term "deionized water", in the sense of the present invention, extends thereto. In accordance with the invention, the term "oil-in-water emulsion" is to be understood as including within its scope oil-in-water/alcohol emulsions.

This invention is directed particularly to the use in oil-in-water emulsions of an oil phase having the following preferred properties. The oil preferably has a density at 15° C. in the range of from 750 to 1050 kg/m$^3$, more preferably in the range of from 980 to 1020 kg/m$^3$. The kinematic viscosity of the oil at 25° C. is preferably in the range of from $5\times10^3$ to $5\times10^6$ cSt, more preferably from $1\times10^4$ to $1\times10^6$ cSt at 20° C. The oil, prior to removal of excess sodium ions, moreover preferably has contents of sodium, vanadium and nickel in the ranges of from 0 to 500 (less than 100 in the first aspect of the invention), from 0 to 600, and from 0 to 150 ppm respectively, more preferably from 0 to 10, from 0 to 100 and from 0 to 20 ppm.

A wide range of viscous hydrocarbons have the above properties. Thus, it is possible to use light, medium, heavy and extra heavy crude oil, bitumen (both natural and manufactured), refinery residue oils of any description (e.g., fuel oil, atmospheric, vacuum, visbreaker, vacuum flashed visbreaker, precipitated asphalt), pitch and tar, particularly from tar ponds.

The hydrocarbons may contain asphaltene in an amount of from 0 to 100 w/w %, preferably from 0 to 20 w/w %, wax in an amount of from 0 to 30 w/w %, more preferably from 0 to 10 w/w % and sulphur in an amount of from 0 to 6, preferably from 0 to 4.5 w/w %.

As mentioned, the oil used for the oil-in-water emulsion may be produced as a result of the treatment of crude oil. A typical such treatment is as follows. The crude oil is transported to a refinery for processing. After undergoing treatment, such as desalting, the crude oil is subjected to atmospheric distillation, that is, heated under atmospheric pressure until products are distilled from the crude. The valuable light products from this process include gasoline, kerosene and gas oil. The less valuable residual products from this process can either be used as the feedstock in oil-in-water emulsion production or for supply to a vacuum distillation column. In the latter case, the residual products are subjected to further heating, but this time under a vacuum. Again, lighter products are produced as well as viscous residual products. Again, it is the latter which may either be used as a feedstock for oil-in-water emulsion production or directed to further processing via a visbreaker and possibly to asphalt producing equipment. Whatever the chosen process, residual waste material will always be produced at each stage and it is this material which can be utilized in the production of the required emulsion fuel.

The waste material can be stored at any suitable temperature. However, it must be cooled/heated to between about 80 and 130° C. for mixing with water to form the oil-in-water emulsion.

In one embodiment, feedstocks for the oil-in-water emulsion fuel are residues produced from Arabian crude oils (light, medium or heavy). For example, the vacuum residue of Arabian Light crude typically has the following chemical and physical properties:

C-85.0% by weight; H-10.7% by weight; N-0.34% by weight; S-3.9% by weight; ash-0.01% by weight; vanadium 63 ppm; nickel 17 ppm; iron 1 ppm; sodium<1 ppm; gravity° API of 6–10; viscosity of 350 cSt at 100° C.

Alternative feedstocks are natural bitumens such as those produced in Alberta or in the Orinoco belt of Venezuela. Analysis details if natural bitumens from Venezuela are presented in U.S. Pat. No. 4, 801,304.

In a typical method for forming the oil-in-water emulsion, the still fluid hydrocarbon waste residue or directly produced hydrocarbon is pumped to a point where it is mixed with water and a material which reduces the interfacial tension between the oil and the water, for example, a surfactant and/or a polymer, using static mixers, in-line mechanical mixers or a combination of both.

The oil-in-water emulsion produced will typically have an oil/water ratio (w/w) in the range of from 65:35 to 90:10, preferably from 70:30 to 85:15. An oil droplet size range of up to 200 $\mu$m, preferably up to 100 $\mu$m, is to be contemplated. Droplet sizes in the range of 1–10 $\mu$m can also be included. The droplet size may thus vary within wide parameters but it is preferred that the emulsion contains oil droplets greater than 150 $\mu$m diameter to an extent of less than 3% w/w, more preferably less than 2% w/w. The emulsion itself will preferably have a density of from 825 to 1050, more preferably form 980 to 1020 kg/m$^3$ at 15° C. and a viscosity at 25° C. and less than 100 sec$^{-1}$ of less than 2000 cSt, more preferably less than 1000 cSt. By operating in accordance with the invention, it is possible to produce a liquid fuel having a gross calorific value of from 28–32 MJkg$^{-1}$, more preferably 29–31 MJkg$^{-1}$ and a net calorific value of 26–30 MJkg$^{-1}$, preferably 27–29 MJkg$^{-1}$.

A most preferred oil-in-water emulsion to be employed in the practice of the present invention is characterized by a water content of about 30% by weight, a mean droplet size in the range from 10 to 70 $\mu$m and possibly a combustion-improving additive, which is a water-soluble or oil-soluble Mg salt such as magnesium nitrate or magnesium sulphate, the combustion improving additive being present in an amount preferably of up to 500 ppm, more preferably up to 100 ppm.

When a surfactant is utilized in producing the emulsion, it may be selected from anionic surfactants, non-ionic surfactants and cationic surfactants, or mixtures thereof. A surfactant is added in an amount in the range of rom 0.1 to 5.0% by weight of the hydrocarbon residue, preferably from 01. to 1.0% by weight of the hydrocarbon residue. Suitable non-ionic surfactants for use in the process include ethoxylated alkylphenols, ethoxylated alcohols, ethoxylated sorbitan esters and mixtures thereof. Cationic surfactants which may be used include hydrochlorines of fatty diamines, imidazolines, ethoxylated amines, amido-amines, quaternary ammonium compounds and mixtures thereof. Anionic surfactants which may be used include esterified long-chain carboxylic acids, sulphuric acid ester and esterified sulphonic acids and mixtures thereof. Preferred anionic surfactants are represented by alkyl aryl sulphonates and alkyl aryl sulphates and mixtures thereof.

Various specific methods are available for the manufacture of oil-in-water emulsions. One specific method is described in WO85/03646 in which mixing is effected under low shear conditions in the range from 10 to 1000 reciprocal seconds in such manner that an emulsion is formed comprising highly distorted oil droplets having mean droplet diameters in the range from 2 to 50 $\mu$m separated by thin interfacial films. Another method is disclosed in GB-A-2262054 which describes the production of bimodal oil-in-water emulsions containing both relatively large oil droplet sizes in the range of 10 to 40 $\mu$m and small droplet sizes in the range of less than or equal to 5 $\mu$m. A further method of forming an emulsion is known from GB-A-974, 042 mentioned earlier herein.

The oil-in-water emulsion which is produced can be used immediately or can be stored prior to transportation by pipeline, barge or ocean-going vessel to be stored again at the site of a combustion facility at which it is to be combusted in a gas turbine.

In accordance with certain embodiments of the present invention, the emulsion is fed to the combustion chamber of a gas turbine where it is converted into energy.

Two types of gas turbine can be used; gas turbines operated in open cycle, in which the exhaust gases are released directly into the atmosphere, or gas turbines operated in combined cycle, in which the exhaust gases are passed through a heat recovery steam generator to extract additional heat before discharge to the atmosphere. The thermal efficiency of oil-in-water emulsions burnt in a gas turbine operated in open cycle is in general similar to that of a conventional steam thermal power station, i.e., between about 30 and 40%, depending on the design and operating conditions of the facility. However, the preferred mode of burning oil-in-water emulsions is in a gas turbine in combined cycle, where thermal efficiencies of between about 40 and 50+% can be achieved.

Combustion of the emulsion fuel proceeds with a turbulent diffusion flame at temperatures and pressures which depend on the design of the turbine combustor. The presence of water in the fuel reduces the peak flame temperature. As a consequence, the formation of NOx is reduced to levels lower than would be achieved with an equivalent heavy fuel oil or water-in-oil emulsion.

In order to reduce vanadium pentoxide formation, which leads to corrosion of the turbine blades, water-soluble or more expensive oil-soluble magnesium compounds are conventionally injected separately into fuel just upstream of the combustion chamber. These magnesium compounds serve two purposes; firstly, as a viscosity modifier for the fuel, if indeed they are needed as such, and secondly as important corrosion inhibitors necessary to protect the turbine blades. However, oil-in-water emulsions have the advantage that the cheaper water-soluble magnesium compounds can be added when the emulsion is formed. Therefore, the use of an oil-in-water emulsion with an added integral inhibitor obviates the need for additional equipment used to add the inhibitor at the combustion stage.

Because of the high sulphur content of refinery bottoms, sulphur dioxide and sulphur trioxide will be formed during combustion of oil-in-water emulsions formed from such refinery bottoms and will be present in the exhaust gases. Therefore, the exhaust gases can be treated using an appropriate Flue Gas Desulphurization (FGD) process. This process takes place immediately downstream of the combined cycle plant.

By way of summary, reference is now made to the accompanying drawing which is a flow diagram showing the various stages in the production and use of an oil-in-water emulsion.

In the first stage, crude oil is produced at an oil field. It is then processed at a refinery or at the oil field to produce a residue for use in forming an emulsion. Alternatively, the emulsion can be formed from a material extracted directly, e.g., a heavy, extra-heavy or natural bitumen, in which case the refinery stage can be omitted. Next, the oil-in-water emulsion is produced; this can take place at the refinery or at a power station or, in the case of directly produced materials, at the oil field. The resulting oil-in-water emulsion is then burnt in a gas turbine to produce energy. The exhaust gases are then used to raise steam in a waste heat boiler for the second electricity generation stage of the combined cycle. Finally, the combustion gases are cleaned in a Flue Gas Desulphurization unit prior to release to the atmosphere.

By working in accordance with the present invention, the benefit is obtained of working with oil-in-water emulsions in a field where the use of such emulsions has not previously been contemplated.

Thus, when high viscosity refinery bottoms are used as the base fuel for the oil-in-water emulsion, benefit is obtained from the easy handling properties of such emulsions in that they have significantly lower viscosities than either the base fuel or water-in-oil emulsions manufactured from the base fuel. Oil-in-water emulsions also induce lower line pressures upstream of the combustor. Because oil-in-water emulsions have lower viscosity, lines upstream of the combustor do not need to be heated to the same extent as with the base fuel or with water-in-oil emulsions.

More particularly, in preferred embodiments, use is made of cheaper, lower quality, denser and more viscous oils than have hitherto been found to be practical for economic application in gas turbine combustion. The likely upper viscosity limit at the combustor for oil-in-water emulsions is higher than the 15 cST generally accepted by those skilled in the art to be the maximum viscosity tolerable if proper fuel atomization into the combustor is to be achieved. In the present invention, the residue is already finely atomized within the continuous water phase. The emulsion can therefore be delivered to the combustor at a much higher viscosity and lower temperature and still exhibit superior combustion characteristics to the fuels delivered in the normal way. Such viscous emulsions typically contain oils selected from heavy or extra heavy crude oil, bitumen, vacuum, visbreaker, vacuum flashed visbreaker and precipitated asphalt, pitch and tar. Good carbon burn-out is achievable even with these high viscosity oils because of the pre-atomization achievable when these oils are present in oil-in-water emulsion form. This results in a significant reduction in particulates.

In addition, the presence of water in the fuel means that the peak flame temperature is lowered and there is a consequent reduction of $NO_x$. Moreover, turbine blades need to be cleaned less frequently with oil-in-water emulsions than with water-in-oil emulsions or with heavy or viscous fuels without any water in them. Insofar as combustion additives are concerned, it is possible to use water-soluble combustion additives which are considerably cheaper than combustion additives which are oil-soluble.

Use of an oil-in-deionized water emulsion containing less than 1 ppm of $Na^+$ has been found to be desirable for the purpose of minimizing corrosion of the turbine blades.

In summary, use is made in accordance with the present invention of a low-cost energy source whose practical and economic use in gas turbine operation has not hitherto been contemplated. When in a combined gas turbine steam or other secondary cycle configuration, gas turbines achieve greater efficiency in converting the fuel to energy compared to a conventional steam thermal power station and, with reduced production cost due to use of a low-cost hydrocarbon source, operation is particularly economical. The use of such a low cost hydrocarbon source means that, in some applications, it can be economical to use emulsion fuels in open cycle gas turbine operation.

What is claimed is:

1. A method of driving a gas turbine comprising combusting a gas turbine fuel composition including a pre-atomized hydrocarbon oil-in-deionized water emulsion in a combustor of the turbine, with the emulsion containing less than 1 ppm of sodium ions and the hydrocarbon oil having a kinematic viscosity of from $5 \times 10^3$ to $5 \times 10^6$ cSt at 25° C.

2. A method as claimed in claim 1, herein the hydrocarbon oil contains $\leq 600$ ppm of vanadium.

3. A method as claimed in claim 1, wherein the hydrocarbon oil contains $\leq 150$ ppm of nickel.

4. A method as claimed in claim 1, wherein the hydrocarbon oil is selected from the group consisting of heavy and extra heavy crude oil, bitumen, pitch, tar, and refinery residue oils.

5. A method as claimed in claim 4, wherein the hydrocarbon oil is a refinery residue oil selected from the group consisting of fuel oil, atmospheric, vacuum, visbreaker, vacuum flashed visbreaker and precipitated asphalt.

6. A method as claimed in claim 1, wherein the emulsion has an oil/water rato (w/w) in the range of from 65:35 to 90:10.

7. A method as claimed in claim 1, wherein the hydrocarbon oil has a droplet size greater than 1 and up to 200 μm.

8. A method as claimed in claim 1, wherein oil droplets greater than 150 μm diameter are present to an extent of less than 3% w/w.

9. A method as claimed in claim 1, wherein the emulsion has a density of from 825 to 1050 kg/m$^3$ at 15° C.

10. A method as claimed in claim 1, wherein the emulsion has a viscosity, at 25° C. and less than 100 sec$^{-1}$, of less than 2000 cSt.

11. A method as claimed in claim 1, wherein the emulsion has a gross calorific value of from 28 to 32 MJkg$^{-1}$ and a net calorific value of 26–30 MJkg$^{-1}$.

12. A method as claimed in claim 1, wherein the emulsion further comprises a surfactant in an amount of from 0.1 to 5.0% by weight of the hydrocarbon oil.

13. A method as claimed in claim 1, wherein the emulsion further comprises a water-dissolved or oil-dissolved magnesium compound present in an amount greater than 0 and up to 500 ppm.

14. A method of preparing a gas turbine fuel composition for use in a gas turbine, said method comprising the steps of:
   (a) selecting a hydrocarbon fuel oil with a kinematic viscosity at 25° C. in the range of from $5 \times 10^3$ to $5 \times 10^6$ cSt;
   (b) washing the hydrocarbon fuel oil to remove excess sodium ions; and
   (c) forming an emulsion of the washed hydrocarbon fuel oil from step (b) in deionized water, with the emulsion containing less than 1 ppm of sodium ions.

15. A method of driving a gas turbine comprising the steps of:
   (a) selecting a hydrocarbon fuel oil with a kinematic viscosity at 25° C. in the range of from $5 \times 10^3$ to $5 \times 10^6$ cSt;
   (b) forming a gas turbine fuel composition as an emulsion of the hydrocarbon fuel oil in deionized water, the emulsion containing less than 1 ppm of sodium ions; and
   (c) combusting the hydrocarbon oil-in-deionized water emulsion produced in step (c) in a combustor of the gas turbine.

16. A method as claimed in claim 15, further comprising:
   washing the hydrocarbon fuel oil to remove excess sodium ions between steps (a) and (b).

17. A method as claimed in claim 15, wherein the hydrocarbon fuel oil contains $\leq$600 ppm of vanadium.

18. A method as claimed in claim 15, wherein the hydrocarbon fuel oil contains $\leq$150 ppm of nickel.

19. A method as claimed in claim 15, wherein the hydrocarbon fuel oil is selected from the group consisting of heavy and extra heavy crude oil, bitumen, pitch, tar, and refinery residue oils.

20. A method as claimed in claim 19, wherein the hydrocarbon fuel oil is a refinery residue oil-selected from the group consisting of fuel oil, atmospheric, vacuum, visbreaker, vacuum flashed visbreaker and precipitated asphalt.

21. A method as claimed in claim 15, wherein the emulsion has an oil/water ratio (w/w) in the range of from 65:35 to 90:10.

22. A method as claimed in claim 15, wherein the emulsion has a density of from 825 to 1050 kg/m$^3$ at 15° C.

23. A method as claimed in claim 15, wherein the emulsion further comprises a surfactant in an amount of from 0.1 to 5.0% by weight of the hydrocarbon oil.

24. A method as claimed in claim 15, wherein the emulsion further comprises a water-dissolved or oil-dissolved magnesium compound present in an amount greater than 0 and up to 500 ppm.

* * * * *